UNITED STATES PATENT OFFICE.

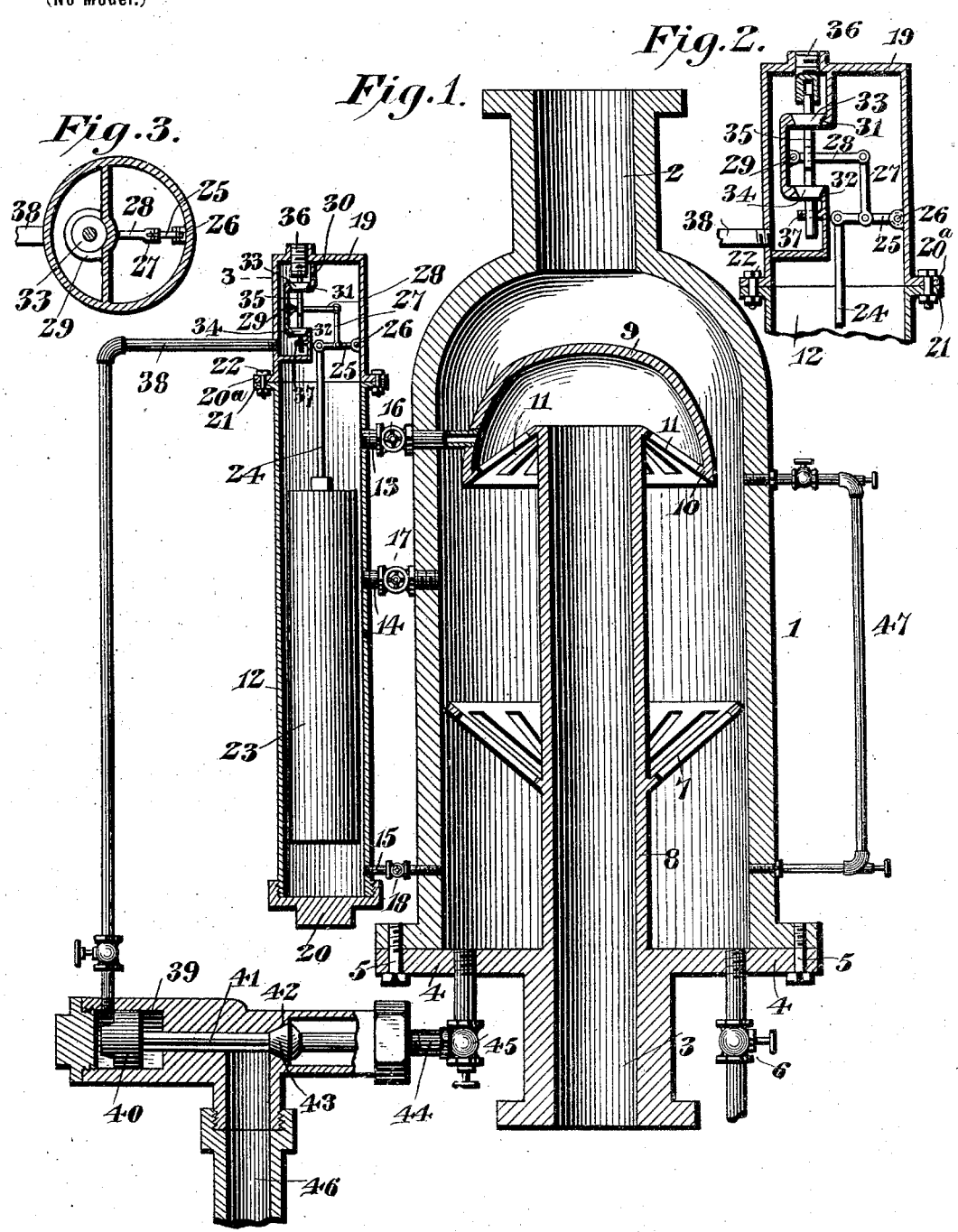

WILLIAM H. REYNOLDS, OF HOUSTON, TEXAS.

STEAM-TRAP.

SPECIFICATION forming part of Letters Patent No. 706,781, dated August 12, 1902.

Application filed July 9, 1901. Serial No. 67,674. (No model.)

*To all whom it may concern:*

Be it known that I, WILLIAM H. REYNOLDS, a citizen of the United States, residing at Houston, in the county of Harris and State of Texas, have invented a new and useful Steam-Trap, of which the following is a specification.

This invention relates to improvements in steam and water separators, and more particularly to that class wherein the valve con10 trolling the escape of the water of condensation from the collecting-trap is operated by the movements of a float actuated by the water of condensation.

The device of the present invention is de15 signed as an improvement upon a steam and water separator for which I obtained Letters Patent in the United States, dated December 4, 1900, No. 663,099.

In the patent referred to the valve mechan20 ism that governs the flow of steam to the valve that controls the escape of water from the collecting-trap comprises a hollow stem connected with the float and provided with a steam-inlet port arranged within the float-cylinder and carries at its upper end a valve having an escape-port adapted to register with a steam-pipe when the float is in its dropped position, thereby to permit any steam within said pipe to escape, thus to allow the valve controlling the escape of water from the trap to seat itself under the internal pressure of the trap. The valve that connects with the stem of the float is provided with a port which communicates at one end with the steam-inlet port of the said hollow stem and which when the valve is raised registers with the bore of the said steam-pipe and allows steam entering from the float-cylinder to pass through the steam-pipe and unseat the valve that con40 trols the water-escape pipe, thus to permit the water of condensation contained within the trap and the float-cylinder to escape. The mechanism thus described for effecting the automatic cut-off of the escape of water or the automatic supply of steam to effect unseating of the water-escape-controlling valve is thoroughly effective in operation; but I have found in practice that there is more or less friction between the valve in the float-cylin50 der and the walls of its seat, which friction causes the device to be less sensitive in operation than is desired.

The object of the present invention is to provide a novel form of valve to govern the supply of steam to the piston actuating the valve that controls the escape of water from the collecting-trap, the valve to be in the nature of a balanced valve, provision being made whereby the steam-pressure will be equal on the top and bottom of the valve at all times, thereby to render the same extremely sensitive of operation, the construction of the valve and the manner in which it is operated to be such as effectually to obviate all danger of the valve becoming locked in its seat.

A further object is to provide means associated with the float-cylinder by which with accuracy to control the movement of the float to prevent the valve carried thereby from closing the steam-port in the steam-supply pipe coacting with the piston that operates the water-escape valve until all the water in the main separator has been discharged or to regulate such means to cause the float-valve to close just at the time that complete discharge of the water is effected, thereby to prevent any waste of steam.

With these and other objects in view, as will appear as the nature of the invention is better understood, the same consists in the novel construction and combination of parts of a steam and water separator, as will be hereinafter fully described and claimed.

In the accompanying drawings, forming a part of this specification, and in which like numerals of reference indicate corresponding parts, I have illustrated a form of embodiment of the invention embodying the essential features of the invention, it being understood that the exact construction and arrangement of parts herein shown may be varied or changed and still be within the scope of the invention, and in the drawings—

Figure 1 is a view in vertical sectional elevation of a steam and water separator embodying the essential features of the invention. Fig. 2 is a sectional detail view, on an enlarged scale, showing the arrangement of the balanced valve for controlling the supply of steam to the water-escape-valve-actuating means. Fig. 3 is a view in horizontal section taken on the line 3 3 of Fig. 1 looking in the direction of the arrow.

Referring to the drawings, 1 designates an upright casing constituting a separating and collecting trap, as it is in this casing that the water is first separated from the steam and then trapped. The casing is provided with upper and lower inlet and outlet necks 2 and 3, respectively, the lower neck 3 being formed with a base-flange 4, bolted to the lower portion of the casing, as at 5. The base-flange has a drain-cock 6 depending from one portion thereof, and from another portion is connected the mechanism for controlling the escape of water from the casing, as will hereinafter appear. The necks 2 and 3 are coupled to lines of piping, (not shown,) one to supply the steam to be subjected to the separating action and the other to convey away the steam thus treated. The interior of the casing at a point intermediate of its ends is provided with downwardly-projecting ribs or wings 7, operating to prevent the water of condensation from splashing upward after it has once escaped the lower portion of the separator, thereby to prevent such water of condensation from coming in contact with and affecting the steam in the upper portion of the casing. The said ribs are in the form of an inverted conical grate integrally formed with a vertically-arranged pipe or tube 8, centrally and removably positioned in the trap and rises from and is preferably integral with the lower neck 3, the upper extremity of the tube 8, directly under the inlet-neck 2, being provided with a baffle-cap 9, having a depending periphery 10, overhanging the upper portion of the pipe or tube to prevent the water of condensation from running under the cap and into the pipe or tube 8. This baffle-cap also forms a practical means of communication between the pipe or tube and the interior of the casing, this being accomplished by openings presented by a plurality of ribs 11, extending from the lower edge of the cap to the upper portion of the tube or pipe. The ribs 11 also serve as an auxiliary means for catching the moisture from the steam, and this moisture will be caused to flow toward the edge of the cap and be deposited in the bottom portion of the casing. The incoming steam first striking the cap 9 will deposit the greater portion of the contained moisture, as well as any entrained grease or other impurities, and after passing between the ribs 11 the steam will have become dry and will flow down through the pipe or tube 8 into the outlet-pipe and thence to the place of use.

In the employment of the separator the lower or bottom portion of the casing 1, which constitutes the water-chamber of the apparatus, is designed to hold sufficient water to operate the float mechanism and its coacting valve mechanism, as will hereinafter appear, and at any time should it be designed to draw out the water from the lower portion or blow out any accumulated sediment this may be effected by any suitable mechanism, the form herein shown and constituting the gist of the present invention being employed. Such mechanism comprises a float-cylinder 12, connected to the lower portion of the water-chamber of the trap and to the upper portion of the same and at a point intermediate of its length by short sections of pipe 13, 14, and 15, respectively, the lower pipe 15 being above the bottom of the casing and the upper pipe being extended through the side of the trap and tapped into the cap 7, the intermediate pipe 14 establishing communication between the trap and the float-cylinder at a point about two-thirds of the height, more or less, of the latter. Each of the pipes carries a valve 16, 17, and 18, the valve 16 controlling the escape of dry steam into the float-cylinder, the valve 17 controlling the escape of water or steam to the cylinder, and the valve 18 operating to control the drop of the float, as by opening or closing this latter valve the float can be regulated so that it will not drop down and close the valve mechanism in the upper portion of the float-cylinder, presently to be described, until all the water in the trap has been discharged, or it may be regulated so that the valve mechanism referred to will close at the same instant that all of the water is discharged from the trap, thereby avoiding any waste of steam.

With the exception of the source of communication presented by the pipes 13, 14, and 15 the cylinder 12 is tightly sealed and is supplied with upper and lower heads 19 and 20, the upper head being a hollow structure provided at its lower end with a flange 20ª to engage a similar flange 21 on the upper end of the float-cylinder, bolts 22, passing through the flanges, serving to hold the head 19 and the float-cylinder securely assembled. With the exception of the addition of the pipe 14 and the head 19, with its contained mechanism now to be explained, the parts of the apparatus so far described are the same as those shown in the patent referred to and operate in substantially the same manner. Mounted for free movement within the float-cylinder is a float 23, having connected with its upper portion the lower end of a stem 24, the upper end of the stem being pivotally connected with one end of an arm 25, the other end of the arm being pivotally connected to the inner side of the head 19, as shown at 26. Connected intermediate of the ends of the arm 25 is one end of an arm 27, the other end of which is pivotally connected with one end of an arm 28, the other end of this latter arm being pivoted to a support 29, carried by a valve-casing 30, formed integral with or secured to the head 19. The valve-casing 30 is provided with two valve-seats 31 and 32, these seats being engaged by tapered valves 33 and 34, carried by a valve-stem 35, the valve-stem being provided with an orifice through which projects the arm 28, as clearly shown in Fig. 2. Arranged in the top of the head 19 is a plug or cap 36, the connection between the plug or cap and the head 19 being preferably by a screw connection, thereby to permit the cap to be detached when it is desired to remove the valves 33 and 34. The two valves 33 and 34 and their connecting-stem 35 constitute a balanced valve, as it will be apparent by reference to Figs. 1 and 2 that the steam-pressure is equal on the upper and lower sides of the valves, and in order to guide the valves for true vertical movement the upper end of the stem 35 works in a seat formed in the cap 36 and the lower end of the valve-stem works in a bearing 37, projecting inward from the lower portion of the valve-casing. It will be seen from the foregoing description that when the float 23 rises it will lift the arm 25, and this latter, through the arms 27 and 28, will lift the valve-stem 30, thereby permitting steam to escape past the valves and into a steam-pipe 38, communicating with the head 19 below the valve 34. The lower extremity of the steam-pipe 38 is tapped into a cylinder 39, the same being by preference disposed in a horizontal plane below the bottom of the trap and has mounted therein a piston 40, carrying a winged stem 41, working in a valve-casing 42 and operating to control or open the main trap or water-escape valve 43, as clearly shown in Fig. 1. This trap-valve regulates a communication between a pipe 44, carrying a valve 45, the pipe being connected with the base-flange 4, and a discharge-pipe 46, the latter operating to run off the water of condensation or other accumulated matter from the trap. The area of the piston 40 is greater than that of the trap-valve 43 in order to overcome the resistance set up by the valve due to the pressure exerted by the water of condensation. The casing 1 has associated with it a gage 47, by which the amount of water within the trap may be readily ascertained.

The operation of the device is as follows: Assuming the parts to be in the position shown in Fig. 1, with the float-cylinder down and the valve 43 seated, the water of condensation passes to the float-cylinder through the pipe 14, which in this instance is located at such distance above the bottom of the trap as to permit the same to be two-thirds full of water before escape takes place to the float-cylinder. As the water of condensation passes through the float-cylinder, the float is slowly lifted, and through the medium of the stem 24, arms 25 and 28 lifts the valves 33 and 34 from their seats, thereby permitting dry steam to pass through the pipe 13, down through the valve-seats 31 and 32 into the steam-pipe 38 and thence to the cylinder 39, forcing the piston to one side and freeing the valve 43 from its seat. When the parts are in this position, the water of condensation in the trap escapes through the pipe 44, past the valve 43, and out through the escape-pipe 46, and this continues until the level of the water within the trap has sunk below the level of the pipe 15, and when this occurs the float will have reached a position to effect automatic closing of the valves 33 and 34, thereby cutting off the escape of steam to the cylinder 39, whereupon the valve 43 will be seated from the pressure of water remaining in the trap. As before pointed out, the pipe 15 is of comparatively small area as compared with the pipe 44, so that by closing the valve on the pipe the float will be held raised until all of the water in the trap has been discharged, whereupon by opening the valve 18 the float will be permitted to drop, and thereby close the valves 33 and 34 in the manner described.

By the arrangement of valves in the float-cylinder shown and described positive operation of these valves will be effected through the medium of the float, any danger of the valves becoming inoperative, as from becoming rust locked or bound, being positively obviated by the contour of the valves.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What I claim is—

1. In a device of the character described, the combination with a trap, a float-cylinder, valve-controlled water-relieving means for the trap and a float within the cylinder, of a hollow head located at the upper end of the float-cylinder, a valve-casing located within said head at one side thereof, a balanced valve controlling the communication between the float-cylinder and the valve-casing, connecting devices operatively connecting the float and the balanced valve, and a conduit extending from the valve-casing to the water-relieving means to convey steam to said water-relieving means when the balanced valve is opened by the actuation of the float.

2. In a device of the character described, the combination with a trap, an exteriorly-arranged float-cylinder, valve-controlled water-relieving means for the trap and a float within the cylinder, of a hollow head located at the upper end of the float-cylinder, a valve-casing located within said head at one side thereof, a pivoted arm mounted in the head opposite the casing, a balanced valve controlling the communication between the float-cylinder and the valve-casing, connecting devices effecting an operative connection between the pivoted arm, the float and the balanced valve, and a conduit extending from the valve-casing to the water-relieving means to convey steam to said water-relieving means when the balanced valve is opened by the action of the float.

3. In a device of the character described, the combination with a trap, an exteriorly-arranged float-cylinder, a float within said cylinder, water-relieving means for the trap, a conduit extending from the float-cylinder to the water-relieving means, and a valve controlling said conduit and connected to the float for actuation thereby, of a valve-controlled pipe establishing communication between the upper portion of the trap and the float-cylinder at a point above the float to permit the escape of steam to the cylinder, a second valve-controlled pipe extending between the trap and cylinder at a point adjacent to the first-named pipe to permit the escape of water from the trap to the float-cylinder, and a third valve-controlled escape-pipe establishing communication between the trap and cylinder adjacent to the lower extremities thereof, said last-named pipe serving to permit the escape of water from the float-cylinder in any desired ratio to the escape of water from the trap, for the purpose of effecting the depression of the float and the closing of the balanced valve either before or after the trap has been entirely emptied, or at the moment of complete discharge, as desired.

In testimony that I claim the foregoing as my own I have hereto affixed my signature in the presence of two witnesses.

WILLIAM H. REYNOLDS.

Witnesses:
 ALBERT J. AMPOLIS,
 GEORGE M. COLBY.